United States Patent

Baral et al.

Patent Number: 5,455,727
Date of Patent: Oct. 3, 1995

[54] TRANSDUCER SUSPENSION ASSEMBLY WITH A FIRST PAIR OF FLANGES FOR RAISING THE RESONANT FREQUENCY AND A SECOND PAIR OF FLANGES FOR INCREASING STIFFNESS

[75] Inventors: Debasis Baral, San Jose; Naum V. Gitis, Cupertino; Francis P. Crimi, Saratoga, all of Calif.; Tave Fruge, Louisville, Colo.; James D. Fahey, San Jose, Calif.

[73] Assignee: Maxtor Corporation, San Jose, Calif.

[21] Appl. No.: 287,702

[22] Filed: Aug. 9, 1994

Related U.S. Application Data

[63] Continuation of Ser. No. 67,532, May 25, 1993, abandoned.

[51] Int. Cl.⁶ .............................. G11B 5/48; G11B 21/16
[52] U.S. Cl. .................................................. 360/104
[58] Field of Search ................................. 360/104, 103

[56] References Cited

U.S. PATENT DOCUMENTS

| | | | |
|---|---|---|---|
| 3,931,641 | 1/1976 | Watrous | 360/104 |
| 4,167,765 | 9/1979 | Watrous | 360/103 |
| 4,991,045 | 2/1991 | Oberg | 360/104 |
| 5,003,420 | 3/1991 | Hinlein | 360/104 |
| 5,079,660 | 1/1992 | Yumura et al. | 360/104 |
| 5,115,363 | 5/1992 | Khan et al. | 360/104 |
| 5,172,286 | 12/1992 | Jurgenson | 360/104 |
| 5,268,805 | 12/1993 | Peng et al. | 360/104 |

FOREIGN PATENT DOCUMENTS 0122978  6/1986  Japan ..................................... 360/104

OTHER PUBLICATIONS

Hutchinson Technology Inc.; "Type 470 Product Summary"; Jun. 1992; pp. i, 1–6.
Hutchinson Technology Inc.; "Type 16 Suspension Assembly Characteristics Summary"; Jun. 20, 1991; pp. i–ii, 1–7.

Primary Examiner—Robert S. Tupper
Assistant Examiner—William R. Korzuch
Attorney, Agent, or Firm—Emery L. Tracy

[57] ABSTRACT

A transducer suspension assembly comprises mounting base plate (40), a spring element (42), a load beam (44) and a flexure (46) having a reduced-footprint slider (60). A partial etch (50) is formed in the spring element of the suspension. The spring element further includes a pair of lateral flanges (54). The flexure contains a second pair of flanges (64) and two longitudinal arrays of openings (70 and 72) formed in the flanges. A shortened, high-stiffness service loop (69) is connected to the reduced-footprint slider.

5 Claims, 5 Drawing Sheets

TRANSDUCER SUSPENSION ASSEMBLY WITH A FIRST PAIR OF FLANGES FOR RAISING THE RESONANT FREQUENCY AND A SECOND PAIR OF FLANGES FOR INCREASING STIFFNESS

This is a continuation of application Ser. No. 08/067,532, filed May 25, 1993 now abandoned.

BACKGROUND

A. Field of Invention

The present invention relates to the field of magnetic recording, particularly to an improved suspension assembly for transducing heads.

B. Description of Prior Art

Currently, rigid-disk drive systems are widely utilized in the field of magnetic recording. A typical disk drive includes a stack of magnetic disks mounted on a rotating spindle. An electro-magnetic actuator controls an array of transducers which read and write binary digital information from and to the disks.

Each transducer (magnetic head) is mounted on an air-bearing slider loaded against the surface of a rotating disk by a spring suspension. The high-speed rotation of the magnetic disk generates a dynamic layer of air, thus allowing the slider to float in close proximity to the disk without physical contact with the disk surface. The separation between the slider and the magnetic disk during the operation of the drive is generally termed "flying height".

It is commonly known in the art that in order to elevate the density of magnetic recording and thereby to increase the storage capacity of the drive, it is necessary to reduce the separation between the magnetic head and the disk. Currently, the desired flying height is in the range of 0 to 75 nanometers (1 nm=$10^{-9}$ m). However, as the flying height decreases, the possibility of contact between the rotating disk and the head also becomes more likely.

Since high-speed contact between the head and the disk, i.e., a head crash, permanently damages the transducer assembly as well as the magnetic disk, several magnetic-head suspension assemblies have been developed in order to eliminate this problem.

One such suspension assembly is manufactured by Hutchinson Technology, Inc., Hutchinson, Minn., and is designated as a Type 470. The suspension assembly, shown in FIG. 1, comprises a base mounting plate 10, a spring element 12, a load beam 14, and a flexure 16. Load beam 14 contains rails 18 and 20 and an apex 22. Flexure 16 has a load-bearing protuberance (or dimple) 24 and is connected to the load beam such that contact can be achieved between apex 22 and protuberance 24. A slider 26, which carries a transducing element (not shown), is rigidly attached to flexure 16.

The Type 470 suspension, however, has some notable shortcomings. Specifically, this assembly was intended for use at head-disk separations greater than 100 nm and thus cannot provide the magnetic recording density which could be obtained in the 0 to 75 nm range.

Several factors contribute to the inability of the Type 470 suspension to reliably achieve a flying height below 100 nm. Namely, these factors include a high head load; low lateral stiffness and high pitch and roll stiffnesses of the flexure; large slider footprint; relatively high vertical spring rate of the load beam; and low resonance frequency of the suspension assembly.

For illustration purposes, vertical bending of a load beam as well as lateral displacement, pitch, and roll of a flexure are shown in FIG. 2, where $F_{vertical}$ represents the vertical bending force acting on the load beam and $F_{lateral}$, $F_{pitch}$, and $F_{roll}$ represent forces causing lateral displacement, pitch, and roll of the flexure, respectively.

The Type 470 assembly requires a relatively high head load (preload of slider against the disk—otherwise known as gram load) of approximately 6 to 10 grams, contributing to increased stiction forces between the slider and the spinning disk. These forces may become large enough to stall the motor that rotates the hard-disk spindle and/or to bend the suspension assembly. Moreover, a high head load greatly increases the friction between the slider and the disk during start-up and shut-down of the disk drive, thus escalating the wear of disk-drive components.

Another shortcoming associated with high head load as well as with low lateral stiffness of flexure 16 is the so called "stick-slip" phenomenon of protuberance 24. In other words, acceleration of the suspension assembly by the actuator (not shown) induces lateral displacement of flexure 16 with respect to load beam 14. The misalignment between the load beam and the flexure causes head-positioning error. This flaw of the Type 470 suspension becomes especially salient in drives with high actuator acceleration.

Additionally, the Type 470 suspension has a slider which possesses comparatively large dimensions of 2.8 mm by 2.2 mm by 0.6 mm. Since the stiction forces between the slider and the disk are proportional to the footprint of the slider, a bigger slider produces greater stiction forces. Furthermore, the mass of a large slider lowers the resonance frequency of the suspension. Low-frequency resonances interfere with the performance of the servo-positioned electro-magnetic actuator of the drive, creating greater possibility of head-positioning error. Resonant vibration can also cause head crashes since, in combination with high pitch and roll stiffnesses of the Type 470 flexure, it impairs the ability of the slider to quickly respond to disk-curvature changes and disk asperities.

Also, high pitch and roll stiffnesses of the flexure contribute to poor magnetic performance of the transducer by adversely affecting the flying attitude of the slider. The transducing element is designed to perform optimally when the slider surface is parallel to the surface of the magnetic disk. Excessive stiffness of the flexure may cause the static orientation of the slider with respect to the disk to deviate from the normal position, thus inducing flying-height variations which interfere with the operation of the transducer.

Moreover, the load beam of the Type 470 suspension has inadequate rigidity which further contributes to resonance problems and impairs suspension integrity at high seek velocities. At the same time, the vertical spring rate of the load beam is relatively high, thus reducing the so called "Z-height" tolerance (Z-height is known in the art as the vertical distance from the mounting point of the base plate of the load beam to the surface of the magnetic disk). Therefore, imprecise mounting of the suspension assembly may lead to head crashes and accelerated wear of disk-drive components.

Furthermore, dampers (additional visco-elastic elements), which are often utilized to reduce vibration magnitude, are expensive and complicated. Dampers made of plastic are also responsible for such undesirable phenomena as outgassing and organic contamination of the disk drive.

In an attempt to eliminate some of the above-mentioned flaws, Hutchinson Technology, Inc., have produced a Type 16 suspension assembly, shown in FIG. 3. The spring element of the suspension has a window 28. The load beam possesses an integral flexure 30 which carries a reduced-footprint slider 32. The slider dimensions are 2 mm by 1.6 mm by 0.4 mm.

The Type 16 suspension has a low head load of 3.5 g, which in combination with the reduced-footprint slider allows to achieve head-disk separation in the range of 75 to 125 nm.

However, the Type 16 suspension cannot fly below 75 nm since its flexure is integral with the load beam and does not provide sufficient flexibility for the slider to flow over disk asperities at critically low altitudes. Hence, head crashes at head-disk separations below 75 nm present a serious problem. Also, high pitch and roll stiffnesses of the flexure contribute to poor magnetic performance of the transducer.

Moreover, even with window 28, the vertical spring rate of the load beam is high, reducing the Z-height tolerance when mounting the suspension assembly.

Additionally, the slider-bonding location of the Type 16 suspension is not well defined. For best performance, the center of mass of the slider should correspond with the geometrical center of the flexure. In the Type 470 suspension, the dimple marks the location of such a geometrical center, thus greatly simplifying accurate placement of the slider with respect to the flexure. However, since the flexure of the Type 16 suspension has no dimple, it is difficult to determine the precise slider-bonding location. If the center of mass of the slider is significantly shifted with respect to the geometrical center of the flexure, unacceptable flying-height fluctuation of the slider may result.

Furthermore, the Type 16 suspension does not have the same geometry as the Type 470, which is widely utilized in many types of disk drives. Therefore, the suspension-mounting systems of the disk drives must be redesigned in order to accommodate the Type 16 suspension, requiring a considerable investment of resources.

SUMMARY OF THE INVENTION

It is accordingly an object of the invention to provide a transducer suspension assembly which overcomes the foregoing disadvantages, i.e., which reliably achieves head-disk separation in the range of 0 to 75 nm and eliminates head crashes at these critically low altitudes, which provides low stiction forces between the head and the disk, which minimizes head and disk wear, which does not resonate at low frequencies, which insures positioning accuracy of the transducer, which retains the geometry of existing suspension assemblies so that changes in hardware and tooling are not necessary, and which is simple and inexpensive to manufacture. Further objects and advantages will become apparent after consideration of the ensuing description and the accompanying drawings.

In one embodiment of the present invention, a transducer suspension assembly comprises a base mounting plate, a spring element, and a load beam which supports a flexure with a slider having a reduced footprint. Improved frequency response of the suspension assembly is achieved by increasing the load-beam thickness, by providing the spring element with a first pair of flanges, and by decreasing the mass of the slider. The small footprint of the slider also permits to lower stiction forces between the slider and the spinning disk. To reduce the vertical spring rate of the suspension, the spring element is partially etched. A second pair of flanges, situated on the sides of the flexure, enhances the lateral stiffness thereof. Furthermore, pitch and roll stiffnesses of the flexure are minimized by providing a longitudinal row of openings along each of the second pair of flanges, as well as by reducing the thickness of the flexure.

DETAILED DESCRIPTION

Figure 1:
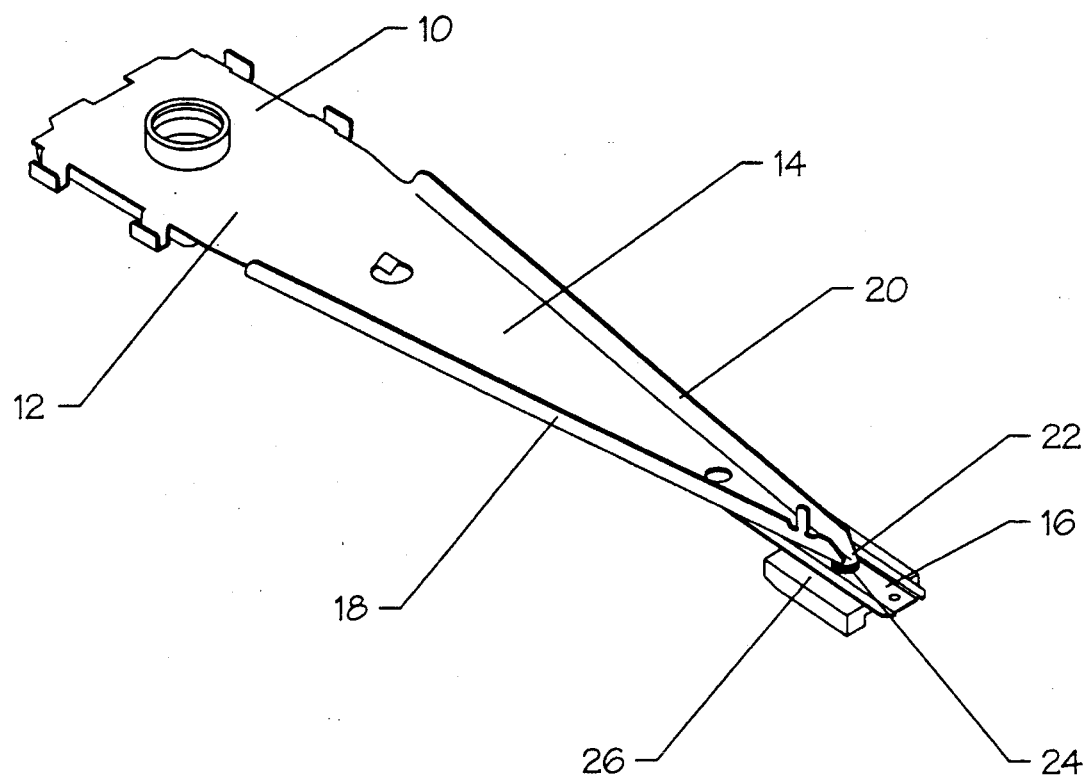
FIG. 1 is a perspective view of a prior-art suspension assembly.
Figure 2:
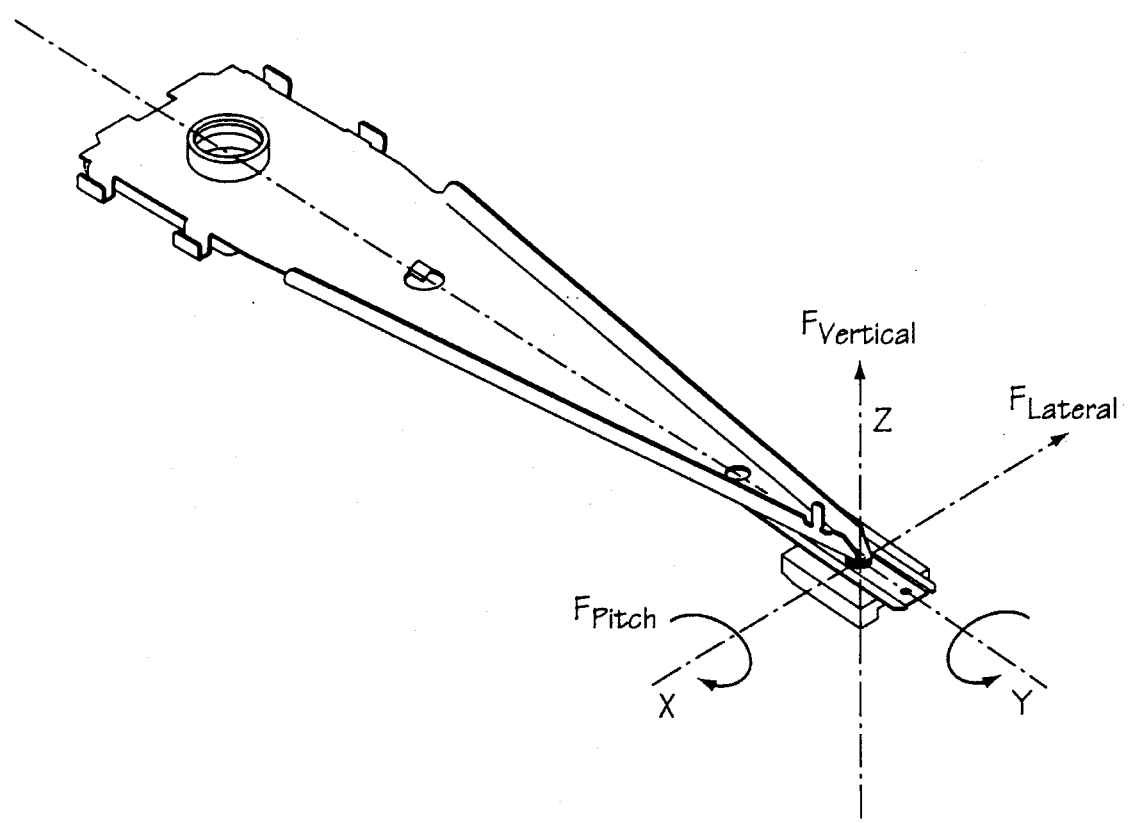
FIG. 2 is a perspective view illustrating the forces acting on a known suspension assembly during operation.
Figure 3:
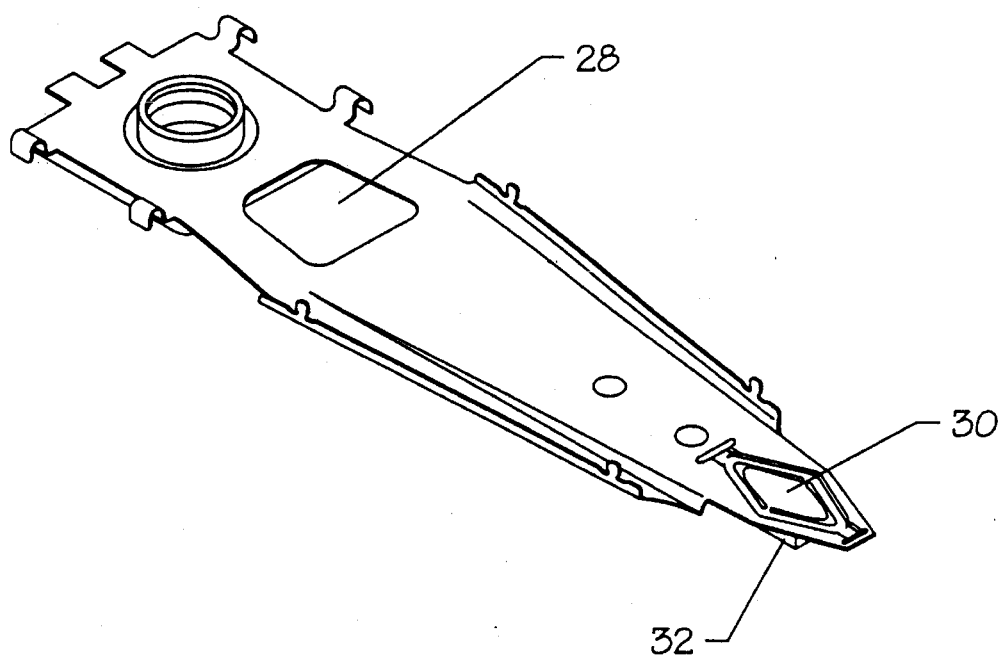
FIG. 3 is a perspective view of another prior-art suspension assembly.
Figure 4:
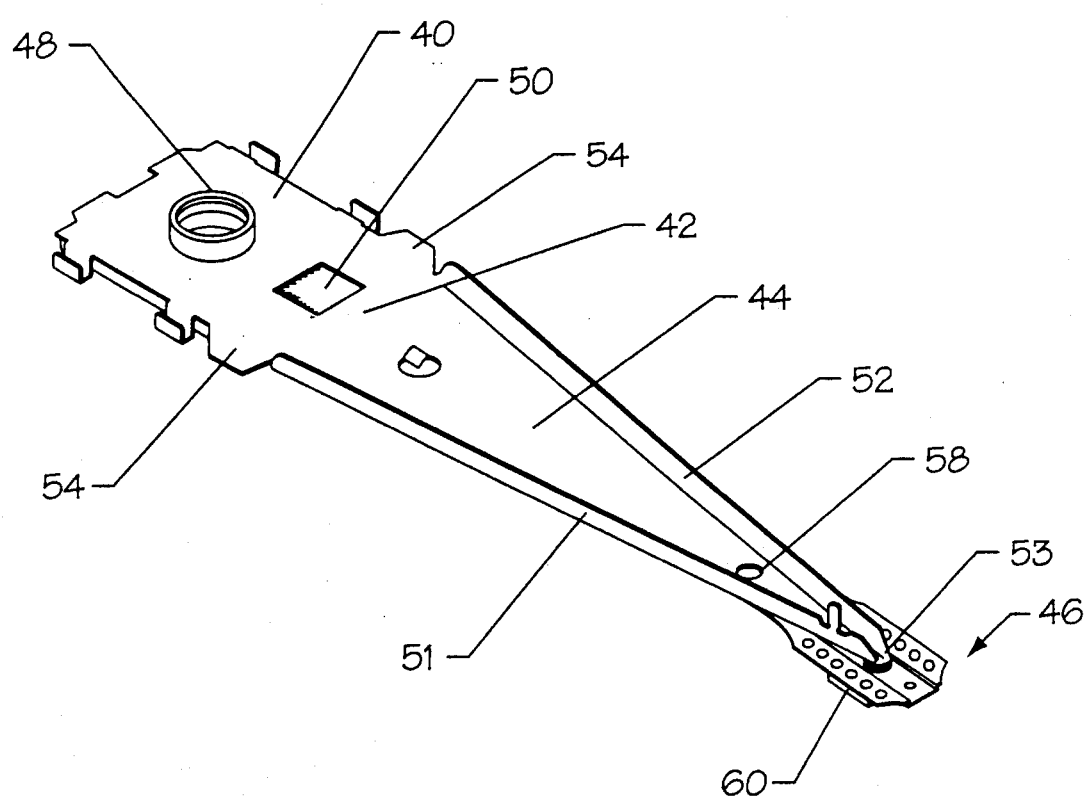
FIG. 4 is a perspective view of a suspension assembly of the present invention.

FIG. 4 shows a perspective view of a transducer suspension assembly according to the present invention.

The suspension assembly comprises a base mounting plate 40, a resilient spring element 42, a load beam 44, and a flexure 46. The base mounting plate contains a swagable connector 48 for attaching the suspension assembly to an actuator arm (not shown). A partial etch (blind hollow) 50 is formed in spring element 42 to reduce the vertical spring rate of the suspension. Load beam 44 further includes rails 51 and 52 as well as an apex 53.

To raise the resonant frequency of the suspension assembly, spring element 42 possesses a first pair of flanges 54. Moreover, in one embodiment of the invention the thickness of the load beam is increased to approximately 0.1 mm in order to enhance its rigidity and to further improve the frequency response.

Flexure 46 is attached to the load beam, e.g., by a weld 58. A reduced-footprint air-bearing slider 60, having dimensions of approximately 2 mm by 1.6 mm by 0.4 mm, is bonded to the flexure with an epoxy adhesive. In turn, slider 60 carries a transducing read/write element (not shown). The reduced footprint of slider 60 allows to minimize stiction forces between the slider and the disk. Moreover, due to the lower mass of the slider, the frequency response of the suspension assembly is improved by further raising the threshold of resonant frequency.

Figure 5:
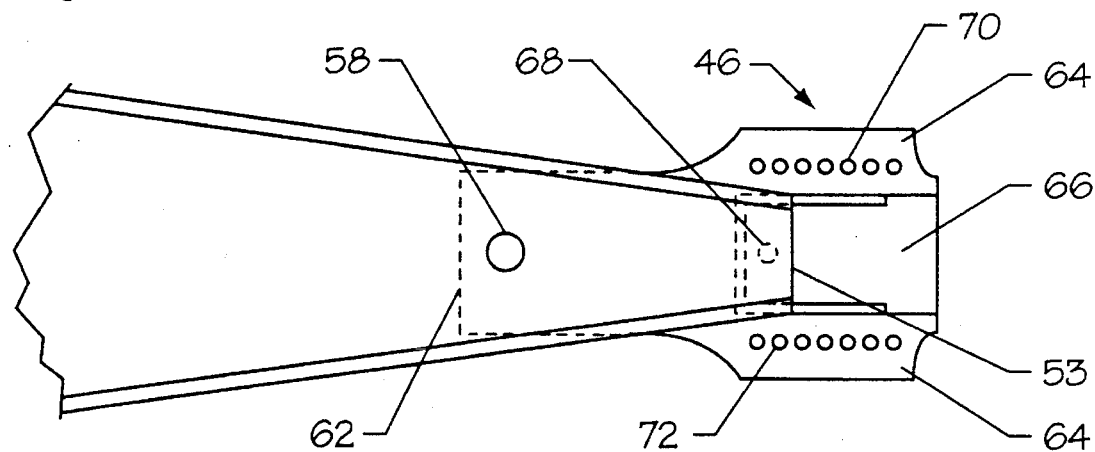
FIG. 5 is a top plan view of a flexure of the suspension assembly of FIG. 4.
Figure 6:
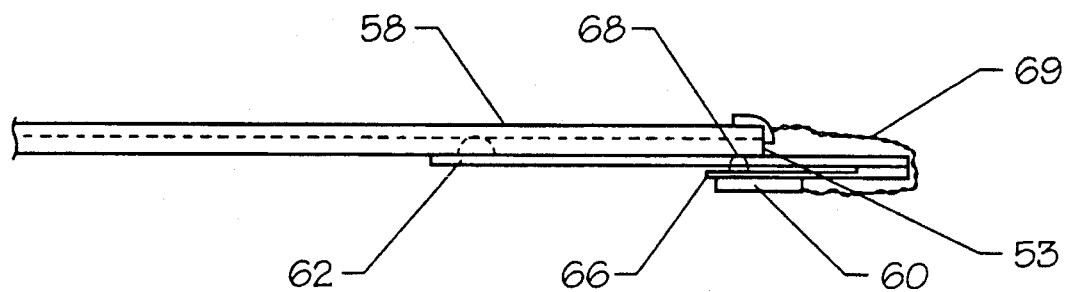
FIG. 6 is a side elevational view of the flexure of FIG. 5.

As shown in FIGS. 5 and 6, the flexure comprises a supporting portion 62 and a flexible tongue 66, connected to portion 62 by suspension bands 63 that have a second pair of flanges 64 extending laterally therefrom. Tongue 66 possesses a protuberance (or dimple) 68 which contacts apex 53 of the load beam. The flexure further includes an electrical service loop 69 which is connected to slider 60 (FIG. 6).

Figure 7:
FIG. 7 is a side elevational view of a flexure of the prior-art suspension assembly of FIG. 1.

Due to the reduction in size and weight of the slider, the dimensions of the flexure are also scaled down. Since flexure 46 is only about 6 mm long, the length of the service loop is decreased accordingly. The comparison between FIG. 6, which shows the flexure according to the present invention, and FIG. 7, which shows the flexure of a prior-art suspension, e.g., the Type 470, illustrates the change in the routing distance of the service loop. The decrease in the length of the service loop makes the service-loop wire stiffer, thus reducing the chance of contact between the wire and the spinning disk during operation of the drive.

In order to minimize pitch and roll stiffnesses, the flexure is provided with two arrays of openings 70 and 72, situated along flanges 64. Moreover, to further lower the pitch and roll stiffnesses of the flexure, its thickness is reduced to about 0.03 mm. Flanges 64 significantly improve the lateral stiffness of the flexure which, in turn, reduces head-positioning error.

In one specific embodiment of the invention, the load beam is approximately 30.8 mm long. The flexure is approximately 1.6 mm wide, while partial etch 52 is about 0.08 mm deep. Both the load beam and the flexure are made of stainless steel.

Thus, it has been shown that we have provided a greatly improved transducer suspension assembly which reliably achieves head-disk separation in the range of 0 to 75 nm and eliminates head crashes at these critically low altitudes, which provides low stiction forces between the head and the disk, which minimizes head and disk wear, which does not resonate at low frequencies, which insures positioning accuracy of the transducer, which retains the geometry of existing suspension assemblies so that changes in hardware and tooling are not necessary, and which is simple and inexpensive to manufacture.

Although the suspension assembly has been shown and described in the form of one specific embodiment, its configurations and materials are given only as examples, and many other modifications of the suspension are possible. For example, the shape and the depth of the partial etch may vary. The flanges of the flexure and load-beam may have different shape, length, and width. Moreover, arrays of opening 70 and 72 may possess different numbers of openings having varying shapes and sizes.

Therefore, the scope of the invention should be determined, not by the examples given, but by the appended claims and their equivalents.

What we claim is:

1. A transducer suspension assembly for carrying a slider, the assembly comprising:
    a base mounting plate;
    a resilient member attached to said base mounting plate, said resilient member having an etch to reduce the vertical spring rate of the resilient member and a pair of first lateral flanges on the opposed peripheral edges of the resilient member adjacent said etch;
    a load beam having a distal end and a proximal end, said distal end being joined to said resilient member, said proximal end having an apex capable of exerting a loading force;
    a flexure member having a supporting portion attached to said proximal end and comprising:
        a pair of suspension bands connected to said supporting portion;
        a flexible portion attached to said pair of suspension bands on opposed peripheral edges of the flexure member that are and having a protuberance for bearing said loading force exerted by said proximal end, the slider being mounted to the flexible portion; and
        a pair of second lateral flanges, each flange formed on one of said pair of suspension bands and horizontally extending beyond the width of the slider, each flange containing a plurality of longitudinally aligned openings.

2. The transducer suspension assembly of claim 1 wherein said base mounting plate, said resilient member, said load beam, and said flexure member are made of stainless steel.

3. The transducer suspension assembly of claim 1 wherein said air-bearing member has dimensions of approximately 2 mm by 1.6 mm by 0.4 mm.

4. The transducer suspension assembly of claim 1 wherein said load beam is approximately 0.102 mm thick.

5. The transducer suspension assembly of claim 1 wherein said flexure member is approximately 6 mm long and about 0.03 mm thick.

* * * * *